Patented Feb. 27, 1934

1,948,878

UNITED STATES PATENT OFFICE 1,948,878

CERAMIC ACOUSTICAL MATERIAL

Richard Ericson and James S. Offutt, Chicago, Ill., and Joseph R. Parsons, Hendersonville, N. C., assignors to United States Gypsum Company, Chicago, Ill., a corporation of Illinois No Drawing. Application March 22, 1932
Serial No. 600,558

7 Claims. (Cl. 25—156)

This invention relates to light weight ceramic materials which may be suitable for acoustical absorption of sound waves or for heat insulating purposes.

In the patent of Richard Ericson, Reissue No. 18,606, a process is described in which light weight ceramic materials are manufactured by incorporating a stable foam in a clay slip prior to drying and firing. In applying this process, certain improved results are obtained by incorporating in the clay slip, a quantity of vegetable, fibrous material. The beneficial results are especially noticed in preparing acoustical tiles by this process as excessive shrinkage during drying is eliminated, the sound absorption of the resulting tiles is increased and the appearance of the acoustical tile is improved.

An object of this invention therefore, is to provide an acoustical tile, heat insulating brick, or other light weight ceramic materials having improved characteristics; also to improve light weight ceramic materials and their methods of manufacture in other respects hereinafter specified and claimed.

The formula for the clay body which we prefer to use for preparing the acoustical tile is as follows:

| | Per cent |
|---|---|
| Water | 23.30 |
| Silicate of soda | .23 |
| Sodium oxalate | .03 |
| Feldspar | 15.60 |
| Whiting | 1.00 |
| Ball clay | 13.32 |
| Georgia kaolin | 20.00 |
| Flint | 16.70 |
| Foam: | |
| Water | 9.33 |
| Soap bark | .23 |
| Alum (16-35 mesh) | .26 |
| | 100.00 |

To the above body is added the desired amount of wood fiber together with sufficient water to keep the mix amply fluid for casting. The wood fibers used are preferably of cottonwood, the longest fibers being about ¾" long and slightly less than ₁⁄₁₆" in diameter and grading from that down to dust. Seven per cent by weight of air dried wood fiber, based on the weight of the dry clay body, is required to eliminate the drying shrinkage. Using different clays, however, this figure may vary somewhat, but should be in the range of 6-10%. With less than this amount added, the reduction in dry shrinkage is roughly proportional to the amount of wood fiber used. Wood fiber of considerably finer grading, (maximum length not over ¼") shows a similar effect in reducing shrinkage. The exact percentage needed to eliminate the dry shrinkage of the clay body, using the finer fibers only, would be about the same as for the coarser fibers.

In preparing the clay slip, the fiber is preferably added to the clay slip after the foam has been added, since this procedure in mixing produces a better acoustic structure. The silicate of soda shown in the above formula acts as a deflocculating agent to make the clay slip of a thin consistency so that it can be poured into the molds as a fluid. The alum used is a flocculating agent which has a retarded action so that after the clay slip has been poured into the molds it soon flocculates and stiffens up, thus locking the foam bubbles in the clay slip and enabling the operator to remove the slip from the molds as a solid but it can not be handled and is left on pallets. After the solidified clay slip has been removed from the molds, it is placed in a drying oven with careful humidity control, and drying is accomplished at a temperature somewhat below 212° F. to produce a rigid shape in the form of a tile, brick, or any other form of molded article desired. The tile is now fired in a furnace at a temperature of about 2200-2300° F. for a period of about 14-16 hours to vitrification. Tiles used for heat insulation are not fired to the point of vitrification. A fired tile is cooled and if an acoustical tile is to be produced, the surface of the tile exposed to the sound waves is removed by grinding or cutting so as to expose the porous interior to the action of the sound waves.

The finished acoustical tile 1" thick produced by our improved fibering process will show a sound absorption at a pitch of C—4 of 69%, whereas, acoustical tiles produced by the same process but without use of fiber, show a sound absorption of only 61%. The use of the fibers therefore improves the sound absorption by 11.6% based upon the 69% value. This higher sound absorption is accounted for by the action of the fibers, since these fibers extend from one foam cell to another, and on burning out during the firing operation, leave the foam cells intercommunicating, so that the sound waves have better access to the interior of the tile.

Using the soap bark foam, cottonwood fibers have been found to give satisfactory results and hackberry, sycamore and ash will also hold the foam very well, while such fibers as willow, basswood, elm and maple cannot be used as they have a tendency to destroy and break down the foam. However, other vegetable fibers may be used with varying success, depending upon their particular characteristics.

We have found that by eliminating the excessive drying shrinkage, it is possible to produce acoustical tiles 12" square, without excessive loss. If we were to manufacture non-fibered tile, it is difficult to make them over 6" square or 6" x 9", because of the excessive drying loss due to shrinkage. The presence of the fiber marks on the finished tile adds character to the tile that a plain, poured structure produced by foam alone does not give. We find that in some cases it is possible to eliminate the alum or other flocculating agents from the clay slip, since the addition of the fiber makes it possible, with proper drying conditions, to manufacture the product without the addition of such a flocculent to retain the foam. The reason for this is that the fiber apparently absorbs enough water from the mixture to partly hold the foam. Of course, the addition of the alum or other suitable flocculent simplifies the manufacture of the acoustical tiles considerably. Heat insulating brick can be manufactured by much the same process which we describe above.

Other argillaceous materials may be used other than that specified by us. Instead of adding foam to reduce the density, gas forming reagents may be added, such as a carbonate and an acid. Black liquor or other alkalis may be added as deflocculating agents instead of sodium silicate if desired. Under some conditions, the flocculating and deflocculating agents may be entirely omitted.

We would state in conclusion that while the illustrated examples constitute practical embodiments of our invention, we do not wish to limit ourselves precisely to these details, since manifestly the same can be considerably varied without departing from the spirit of the invention, as defined in the appended claims.

Having thus described our invention, we claim as new and desire to secure by Letters Patent:—

1. A plastic composition comprising a clay body, a deflocculating agent, foam, a flocculating agent, water and vegetable fiber.

2. A plastic composition suitable for drying and firing to the point of vitrification, comprising clay, water, a density reducing agent, a deflocculating agent, a flocculating agent, and wood fiber.

3. An argillaceous composition comprising clay, water, a deflocculating agent, a flocculating agent, a density reducing agent, and wood fiber.

4. The process of preparing an acoustical tile, which comprises mixing vegetable fibers with a clay slip containing a density reducing agent, molding the slip into predetermined shapes, and drying and firing said shapes to produce porous, acoustical tiles.

5. An acoustical tile comprising a clay body containing a multitude of small air cells connected by inter-communicating passages formed by the burning out of vegetable fibers.

6. A clay slip containing a density reducing agent forming a multitude of air cells, and vegetable fibers in said slip for retarding shrinking and cracking upon drying of a cast made from said slip.

7. The process of producing a fired clay ceramic tile which comprises first forming a deflocculated clay slip and adding thereto a tenaceous foam and an agent capable of re-flocculating said slip after a definite lapse of time, thereupon incorporating ligneous fibers with the thus produced mixture, placing the final mixture into a mold and letting it set up therein, drying the thus produced form, and then firing the same to harden it while at the same time burning out the added fibers, which thereby produce interconnecting passages between the voids left by the foam.

RICHARD ERICSON.
JAMES S. OFFUTT.
JOSEPH R. PARSONS.